(12) United States Patent
Gusikhin et al.

(10) Patent No.: US 11,693,421 B2
(45) Date of Patent: Jul. 4, 2023

(54) ENHANCED REMOTE CONTROL OF AUTONOMOUS VEHICLES

(71) Applicant: Ford Global Technologies, LLC, Dearborn, MI (US)

(72) Inventors: Oleg Yurievitch Gusikhin, Commerce Township, MI (US); Omar Makke, Lyon Township, MI (US); John Matthew Ginder, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 17/317,807

(22) Filed: May 11, 2021

(65) Prior Publication Data

US 2022/0365541 A1 Nov. 17, 2022

(51) Int. Cl.
| | |
|---|---|
| *G05D 1/00* | (2006.01) |
| *G05D 1/02* | (2020.01) |
| *G08G 1/14* | (2006.01) |
| *G06T 7/20* | (2017.01) |
| *B60W 30/06* | (2006.01) |

(Continued)

(52) U.S. Cl.
CPC .......... *G05D 1/0246* (2013.01); *B60W 30/06* (2013.01); *G06T 7/20* (2013.01); *G06T 7/70* (2017.01); *G06V 20/52* (2022.01); *G06V 20/586* (2022.01); *G08G 1/141* (2013.01); *G05D 2201/0213* (2013.01); *G06V 2201/08* (2022.01)

(58) Field of Classification Search
CPC .......... G05D 1/0246; G05D 2201/0213; G06T 7/70; G06T 7/20; G06V 20/52; G06V 20/586; G06V 2201/08; B60W 30/06; G08G 1/141

USPC .......................................................... 701/25
See application file for complete search history.

(56) References Cited

U.S. PATENT DOCUMENTS

| | | | |
|---|---|---|---|
| 10,239,521 | B1 | 3/2019 | Xiao et al. |
| 2019/0394626 | A1* | 12/2019 | Hitotsumatsu ......... H04W 4/38 |
| 2020/0192352 | A1 | 6/2020 | Rastoll et al. |

FOREIGN PATENT DOCUMENTS

| | | |
|---|---|---|
| CN | 111445720 A | 7/2020 |
| FR | 3084770 A1 | 2/2020 |
| WO | 2019211987 A1 | 11/2019 |

OTHER PUBLICATIONS

PewDiePie, "Pokemon Go From Your Computer!! (Pokémon Go—Part 4)," Jul. 26, 2016, YouTube, Whole Video. (Year: 2016).*

(Continued)

*Primary Examiner* — Tyler J Lee
*Assistant Examiner* — Tiffany P Ohman
(74) *Attorney, Agent, or Firm* — Brandon Hicks; Eversheds Sutherland (US) LLP

(57) ABSTRACT

Devices, systems, and methods for remote control of autonomous vehicles are disclosed herein. A method may include receiving, by a device, first data indicative of an autonomous vehicle in a parking area, and determining, based on the first data, a location of the autonomous vehicle. The method may include determining, based on a the location, first image data including a representation of an object. The method may include generating second image data based on the first data and the first image data, and presenting the second image data. The method may include receiving an input associated with controlling operation of the autonomous vehicle, and controlling, based on the input, the operation of the autonomous vehicle.

17 Claims, 5 Drawing Sheets

(51) Int. Cl.
*G06T 7/70* (2017.01)
*G06V 20/52* (2022.01)
*G06V 20/58* (2022.01)

(56) References Cited

OTHER PUBLICATIONS

"Teleoperated driving safely controlling cars remotely", T-Systems, Oct. 20, 2020, Germany, 6 pages.

* cited by examiner

ENHANCED REMOTE CONTROL OF AUTONOMOUS VEHICLES

BACKGROUND

People increasingly are using autonomous vehicles. Some parking of autonomous vehicles may require human supervision. However, human operators may not be able to facilitate parking of autonomous vehicles.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
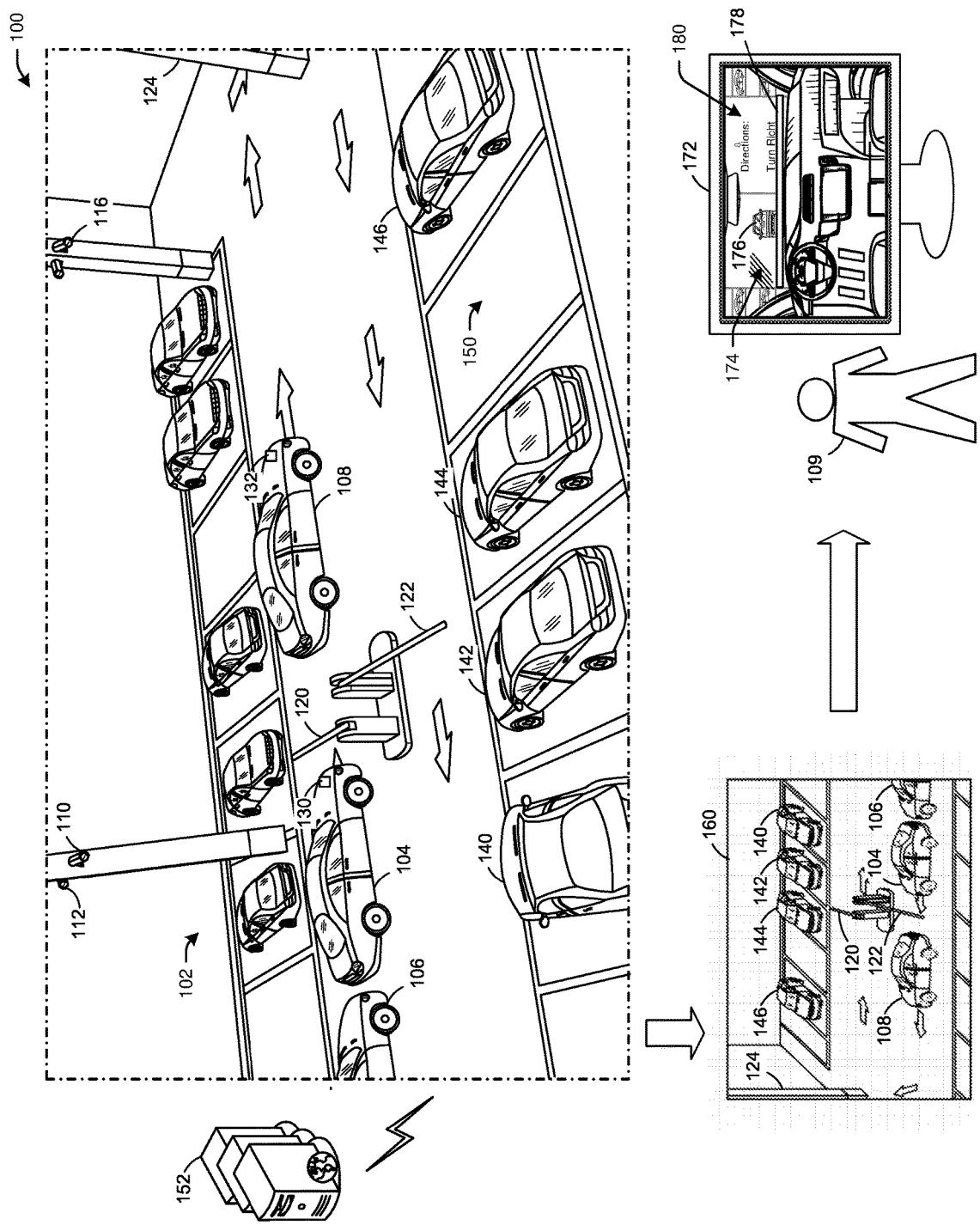
FIG. 1 depicts an illustrative remote parking system for autonomous vehicles in which techniques and structures for providing the systems and methods disclosed herein may be implemented.

People increasingly are using autonomous vehicles. To park autonomous vehicles, some laws, standards, and other governing regulations are being developed. In some autonomous vehicle parking systems, a human operator may be required to facilitate the autonomous vehicle parking. However, some methods for allowing human operators to remotely control the operation and parking of autonomous vehicles without being inside of the autonomous vehicles may suffer from connectivity delay (e.g., between devices used to control the autonomous vehicles), connectivity weakness, significant use of bandwidth (e.g., to stream images of vehicles, with more vehicles requiring additional bandwidth), and from an inability of a remote human operator to see from the perspective of a vehicle driver.

There is, therefore, a need for enhanced remote control of autonomous vehicles.

In one or more embodiments, autonomous vehicles may be directed to and from parking spaces in a parking area (e.g., parking lot, parking structure, or the like). The autonomous vehicles may be directed by a remote operator who may provide controls using one or more devices that result in corresponding commands sent to the autonomous vehicles to control speed, direction, and the like. The parking area may have cameras capable of detecting images of the parking areas at different locations. Because the locations of the cameras may be known, when images captured by the cameras indicate the presence of autonomous vehicles, the locations of the autonomous vehicles in or near the parking area may be determined (e.g., using one or more devices). Alternatively or in addition, the autonomous vehicles may provide their locations (e.g., using global positioning coordinates or the like) to one or more devices to identify vehicle locations in or near the parking area. The camera images also may be used to identify other vehicles, objects, people, or the like. Based on the camera images and vehicle location, one or more devices may generate a video feed in which the individual video frames represent a point of view that would be seen by a driver if there were a human driver of the autonomous vehicle. In this manner, a human operator representing a driver of the autonomous vehicle may see, in real time, other vehicles, objects, people, and the like near the autonomous vehicle, allowing the human operator to control the autonomous vehicle by directing the autonomous vehicle to a parking space.

In one or more embodiments, the image data of the camera images may be sent to one or more devices for image analysis. Using image analysis techniques, such as computer vision, machine learning, or the like, the one or more devices may identify objects near an autonomous vehicle. Alternatively or in addition, some objects may be known based on a location of a camera that captured an image of an autonomous vehicle. For example, entry/entrance structures, columns, signs, lights, and the like may be known objects of a parking area within a camera's field of view. Knowing the location of a vehicle, one or more devices may determine (e.g., using a map and/or other known object locations) some objects and their locations relative to the autonomous vehicle.

In one or more embodiments, using image and/or vehicle location data, one or more devices may generate a real time representation of a point of view of a driver of an autonomous vehicle if the autonomous vehicle had a driver (e.g., a point of view from the driver's seat). Images of the parking area may be provided to the one or more devices, or location data based on the images or vehicle information may be provided to the one or more devices (e.g., to reduce bandwidth and latency). Using known object locations based on a vehicle's location in a parking area, the one or more devices may generate images representing video frames. To reduce the amount of resources required for such image generation, some of the image data may be pre-generated. For example, images of vehicles, people, and/or objects may be pre-generated for vehicles, people, and/or objects known to be in a parking area. The pre-generated assets may be included in the image data used to represent real time video of the autonomous vehicle driving through the parking area. In this manner, rather than having to generate the exact representations of specific people, vehicles, or objects, which may be unnecessary for a human operator (e.g., the human operator may not need to know a nearby vehicle's color, make, model, etc., just that the vehicle is present at a certain distance from the autonomous vehicle being controlled), generic representations of people, vehicles, or objects may be included in the images. In this manner, the time needed to process and generate images may be reduced, allowing for real time video presentation to the human operator. In addition, bandwidth and other computer resources may be conserved by using the pre-generated assets.

In one or more embodiments, to account for a delay in wireless communications, one or more devices may consider the round trip time of communications between a human operator (e.g., remotely controlling an autonomous vehicle) and the time at which the autonomous vehicle performs a corresponding action. For example, it is not desirable for a human operator to provide a braking command to stop an autonomous vehicle only to have a delay between the command and the vehicle braking prevent the vehicle from braking too late. To account for the delay and the real time nature of an autonomous vehicle moving through a parking area, the scale of the real time video presented to the human operator may change to simulate when the autonomous vehicle is moving closer to or away from an object. For example, as the autonomous vehicle approaches another vehicle, a person, or an object, the presentation of the vehicle, a person, or an object to the human operator may show the vehicle, a person, or an object as becoming larger from frame to frame (or smaller from frame to frame when the vehicle, a person, or an object is moving further away from the autonomous vehicle). When multiple autonomous vehicles are being remotely controlled, the worst round trip delay time from among the autonomous vehicles may be applied to any of the autonomous vehicles when presenting the real time video to human operators (e.g., the round trip time may correspond to the rate at which the autonomous vehicle approaches or moves away from a vehicle, a person, or an object, and therefore may affect the size of the presentation of the vehicle, a person, or an object in the video). The speed of the autonomous vehicle may be provided by the autonomous vehicle or detected based on the location of the autonomous vehicle in the camera images captured at a frame rate (e.g., using the frame rate and locations of the autonomous vehicle in the images, a device may determine the distance divided by time, equaling the speed).

In one or more embodiments, directions to an open (unoccupied) parking space in the parking area may be presented to a human operator to allow the human operator to issue driving commands to the autonomous vehicle, causing the autonomous vehicle to drive to the open parking space. A device may maintain a list of parking spaces, whether they are occupied (e.g., based on image data and/or parking reservation/payment data, etc.), and the locations of the parking spaces in the parking area. Based on the location of an autonomous vehicle, a device may generate directions from the location of the autonomous vehicle to the parking space and may present the directions to the human operator (e.g., overlaying the real time video from the driver's seat perspective).

Illustrative Embodiments

Turning now to the drawings, FIG. 1 depicts an illustrative remote parking system 100 for autonomous vehicles in which techniques and structures for providing the systems and methods disclosed herein may be implemented.

Referring to FIG. 1, the remote parking system may include a parking area 102 in which vehicles may park (e.g., a parking lot, a parking structure, etc.). Vehicles (e.g., vehicle 104, vehicle 106, vehicle 108, etc.) may be autonomous vehicles. To park autonomous vehicles in the parking area 102, a human operator 109 remotely may control operation of the autonomous vehicles (e.g., by controlling speed, steering, etc.). The parking area may include cameras (e.g., camera 110, camera 112, camera 116, etc.) whose locations (and corresponding fields of view) may be known. Other objects in the parking area may be static/stationary, so their locations also may be known. For example, locations of the entrance gate 120, the exit gate 122, columns (e.g., column 124), and the like (e.g., signs, trees, etc.) may have known locations (e.g., because their locations are fixed or are known at a given time of day). In this manner, the presence of known objects may identified in images of the parking area 102 simply by knowing the location of the camera that captured the images. The locations of some vehicles in the parking area 102 may be identified based on image analysis as explained further below, and also may be provided by the vehicles themselves. In addition, images of the parking area 102 may be captured not only by the cameras of the parking area 102, but also by vehicle cameras (e.g., camera 130 of the vehicle 104, camera 132 of the vehicle 108, etc.). Other objects in the parking area 102 may not be known, but may be identified in images as explained further below. For example, vehicles (e.g., the vehicles 104-108, vehicle 140, vehicle 142, vehicle 144, vehicle 146, etc.), in the parking area may be parked or moving, so controlling an autonomous vehicle in the parking area 102 may need to account for the presence of such objects. The remote parking system 100 may identify available and unavailable parking spaces (e.g., parking space 150) by using image analysis and/or maintaining data for reserved and unreserved parking spaces.

Still referring to FIG. 1, the remote parking system 100 may analyze images captured by the cameras of the parking area 102. For example, using computer vision, machine learning, or other object identification techniques, devices of the remote parking system 100 (e.g., the cameras or one or more other devices 152 in or remote from the parking area 102) may analyze images of the parking area provided by the cameras of the parking area 102 and/or the cameras of vehicles of the parking area 102 to identify objects and generate a real time representation of a driver's seat perspective from within an autonomous vehicle in the parking area 102. As shown, an image 160 may represent an image captured by a camera of the parking area 102 (e.g., the camera 110). When controlling the parking of the vehicle 104, for example, the remote parking system 100 may analyze the image 160 and other images over time to identify the location of the vehicle 104, the speed of the vehicle 104 (e.g., based on the vehicle's location across multiple images and the frame rate of the image capture), and the location of other objects in the parking area. The remote parking system 100 may determine which objects may be visible from the driver's seat of the vehicle 104 (e.g., objects in front of and to the side of the vehicle 104), and how fast the vehicle 104 is approaching another object.

Still referring to FIG. 1, using the image data of the image 160, the remote parking system 100 may generate a representation (e.g., image data for respective frames of video) from the perspective of the driver's seat of the vehicle 104 to present to the human operator 109. As shown, using a device 172, the remote parking system 100 may present a real time representation 174 to the human operator 109 to allow the human operator 109 to simulate being in the vehicle 104 while driving the vehicle 104. The real time representation 174 may include image data from the image 160 and/or pre-generated image assets. For example, the exact representation of the vehicle 108 (e.g., color, make, model, etc.) may not be necessary for the human operator 109 to see in order to operate the vehicle 104. Instead, the presence of a vehicle in front of the vehicle 104 may suffice, so a pre-generated image of a vehicle 176 may be used to generate the real time representation 174. In addition, because the locations of the image 160 and the location of the entrance gate 120 are known, the entrance gate 120 may be shown as a pre-generated representation 178 of the entrance gate 120. In this manner, image processing may be less resource-intensive, reducing time, bandwidth, latency, and the like, so that the presentation of the real time representation 174 may be in real time. In addition, the remote parking system 100 may identify an open parking space, may generate directions to the open parking space from the known location of the vehicle 104, and may present driving directions 180 using the real time representation 174 (e.g., using an overlay to allow the human operator 109 to see the driving directions 180 while operating the vehicle 104).

In one or more embodiments, the data provided to the one or more devices 202 and/or to the device 172 may include the image 160, or may include location data for the image 160 (e.g., the location of the camera that captured the image 160). By providing the location data rather than the entire image, a live stream of video of the parking area 102 may not be necessary, thereby reducing bandwidth, latency, and processing resources. Instead, the one or more devices 202 and/or the device 172 may have access to the pre-generated assets and location data, and may use the pre-generated assets and location data to generate the real time representation 174. For example, given the location of the image 160 and the vehicle 104, the one or more devices 202 and/or the device 172 may identify known objects at the location. When the location data identifies that an object is detected (e.g., the vehicle 108), the one or more devices 202 and/or the device 172 may use the pre-generated image of the vehicle 176 when generating the image data for the real time representation 174.

In one or more embodiments, to account for a delay in wireless communications, the parking system 100 may consider the round trip time of communications between the human operator 109 (e.g., control inputs to the device 172 to control the speed, direction, etc. of the vehicle 104) and the time at which the vehicle 104 performs a corresponding action (e.g., accelerates, brakes, turns, etc.). For example, it is not desirable for the human operator 109 to provide a braking command to stop the vehicle 104 only to have a delay between the command and the vehicle 104 braking prevent the vehicle 104 from braking too late. To account for the delay and the real time nature of an autonomous vehicle moving through a parking area, the scale of the real time representation 174 to the human operator 109 may change to simulate when the vehicle 104 is moving closer to or away from an object (e.g., as shown in more detail in FIGS. 2 and 3). For example, as the vehicle 104 approaches another vehicle (e.g., the vehicle 108), the real time representation 174 of the pre-generated image of the vehicle 176 may show the pre-generated image of the vehicle 176 as becoming larger from frame to frame (or smaller from frame to frame when the vehicle 108 is moving further away from the vehicle 104). When multiple autonomous vehicles are being remotely controlled (e.g., the vehicle 104-108), the worst round trip delay time from among the autonomous vehicles may be applied to any of the autonomous vehicles when presenting the real time representation 174 to the human operators 109 (or multiple human operators). The speed of the vehicle 104 may be provided by the vehicle 104 or detected based on the location of the vehicle 104 in the camera images captured at a frame rate (e.g., the frame rate indicative of the time, and when combined with a vehicle location, the vehicle speed may be determined).

Figure 2:
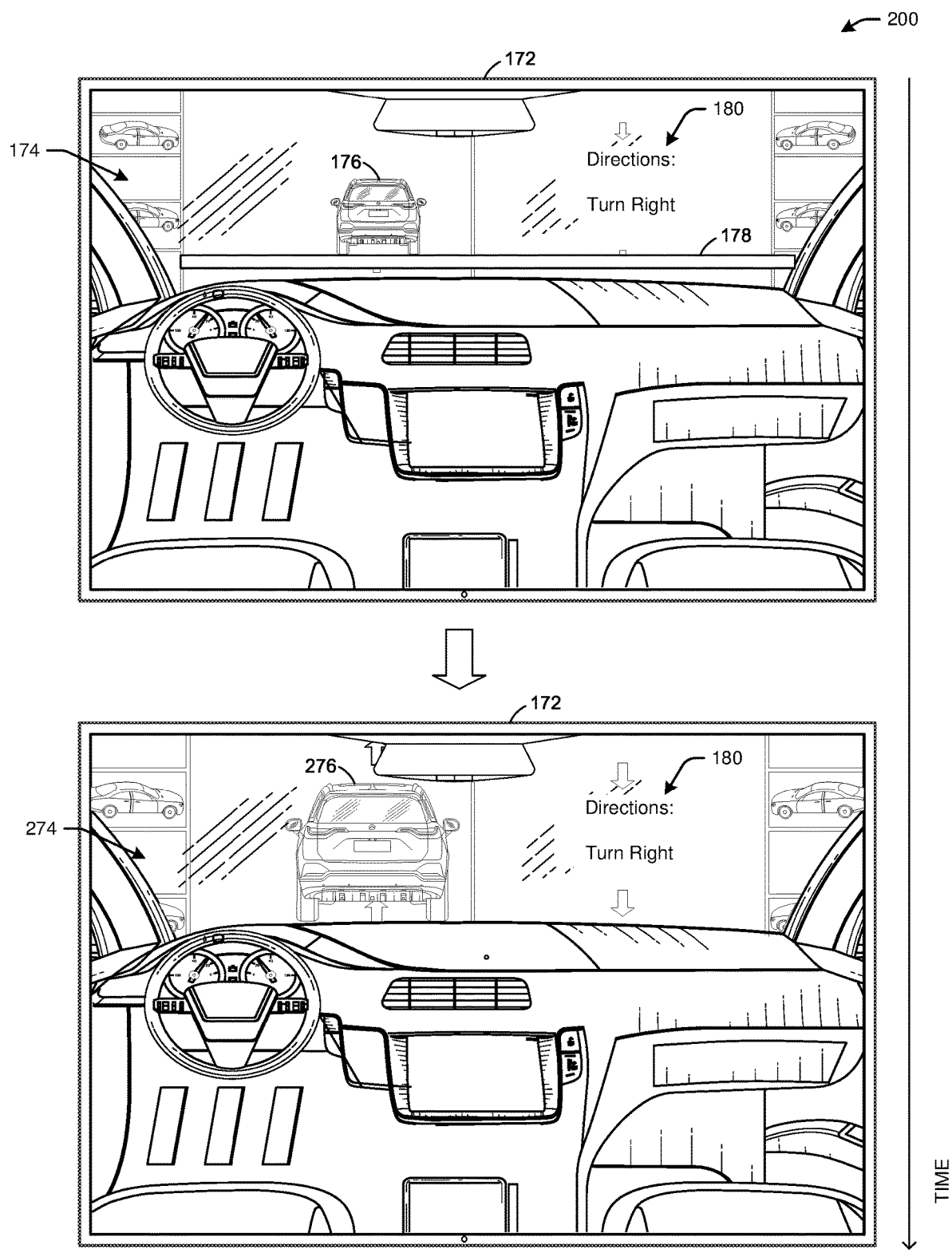
FIG. 2 depicts an illustrative presentation of remote parking of autonomous vehicles.

FIG. 2 depicts an illustrative presentation 200 of remote parking of autonomous vehicles.

Figure 3:
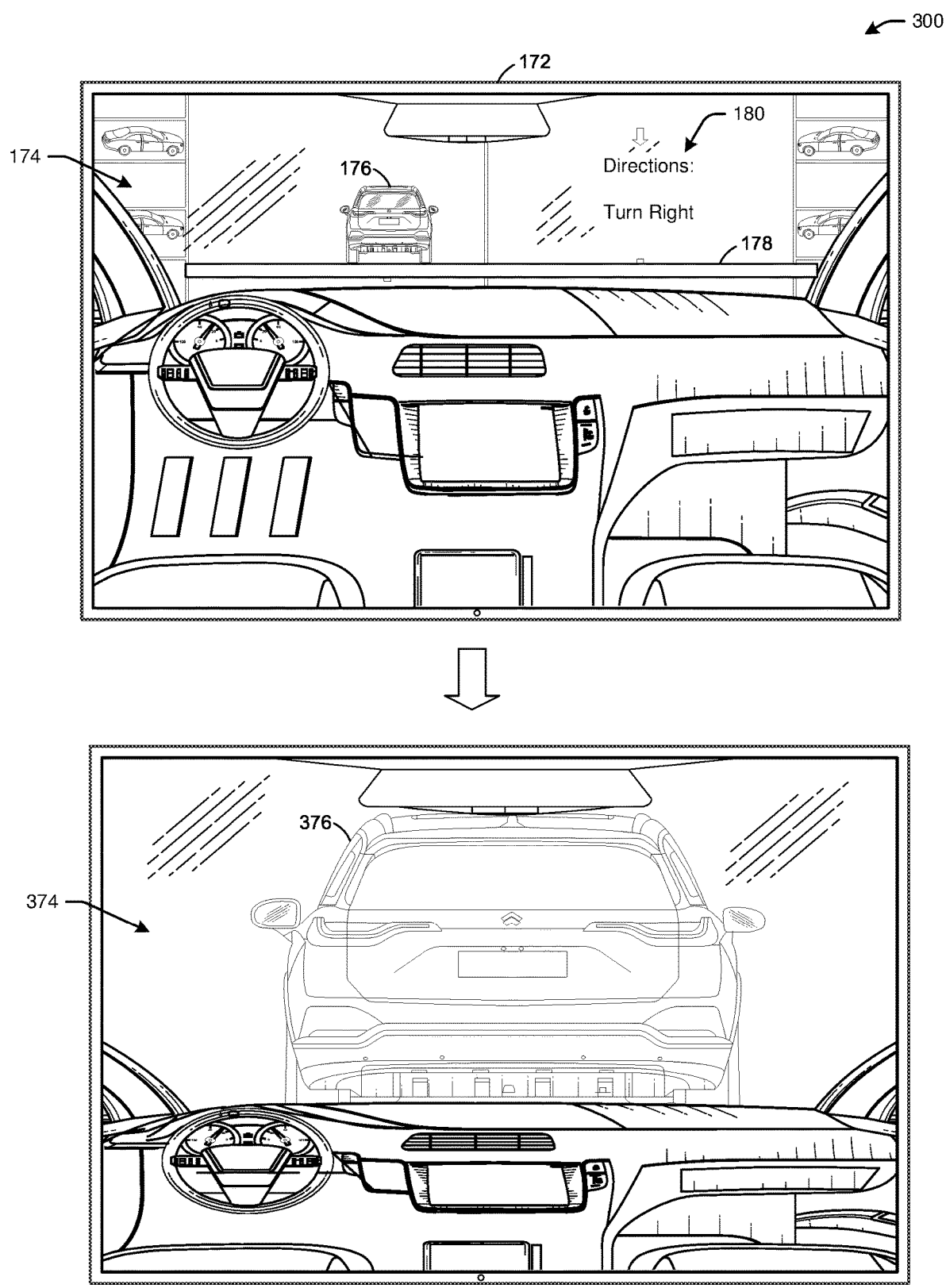
FIG. 3 depicts an illustrative presentation of remote parking of autonomous vehicles.

Referring to FIG. 2, the real time representation 174 of FIG. 1 is shown. Over time (e.g., multiple images including the image 160 of FIG. 1), the vehicle 104 of FIG. 1 (e.g., the vehicle from whose point of view the real time representation 174 is being presented) may approach an object (e.g., the vehicle 108 of FIG. 1). To represent the speed at which the vehicle 104 approaches an object, and to account for the delay time between the human operator 109 of FIG. 1 issuing a command to control operation of the vehicle 104 and the vehicle 104 performing an action corresponding to the command, the scale (e.g., size) with which the object is represented by the real time presentation 174 may be adjusted. For example, the faster the vehicle 104 approaches the vehicle 108, the faster the scale of the pre-generated image of the vehicle 176 may be shown. In FIG. 2, a real time representation 274 (e.g., representing a subsequent video frame after the real time representation 174) may show a larger representation 276 of the vehicle 108 to indicate to the human operator 109 that the vehicle 104 is getting closer to the vehicle 108. As shown in FIG. 3, the scale of the pre-generated image of the vehicle 176 may be adjusted more quickly than the real time representation 274 of FIG. 2 to show a larger representation of the vehicle 108 as the vehicle 104 gets closer to or more quickly approaches the vehicle 108.

FIG. 3 depicts an illustrative presentation 300 of remote parking of autonomous vehicles.

Referring to FIG. 3, the real time representation 174 of FIG. 1 is shown. Over time (e.g., multiple images including the image 160 of FIG. 1), the vehicle 104 of FIG. 1 (e.g., the vehicle from whose point of view the real time representation 174 is being presented) may approach an object (e.g., the vehicle 108 of FIG. 1). To represent the speed at which the vehicle 104 approaches an object, and to account for the delay time between the human operator 109 of FIG. 1 issuing a command to control operation of the vehicle 104 and the vehicle 104 performing an action corresponding to the command, the scale (e.g., size) with which the object is represented by the real time presentation 174 may be adjusted. For example, the faster the vehicle 104 approaches the vehicle 108, the faster the scale of the pre-generated image of the vehicle 176 may be shown. In FIG. 3, a real time representation 374 (e.g., representing a subsequent video frame after the real time representation 174) may show a larger representation 376 of the vehicle 108 to indicate to the human operator 109 that the vehicle 104 is getting closer to the vehicle 108. As shown in FIG. 3, the scale of the pre-generated image of the vehicle 176 may be adjusted more quickly than the real time representation 274 of FIG. 2 to show a larger representation of the vehicle 108 as the vehicle 104 gets closer to or more quickly approaches the vehicle 108. In this manner, the scale of the pre-generated image of the vehicle 176 may be based on the round trip delay time and/or the speed of the vehicle 104.

Figure 4:
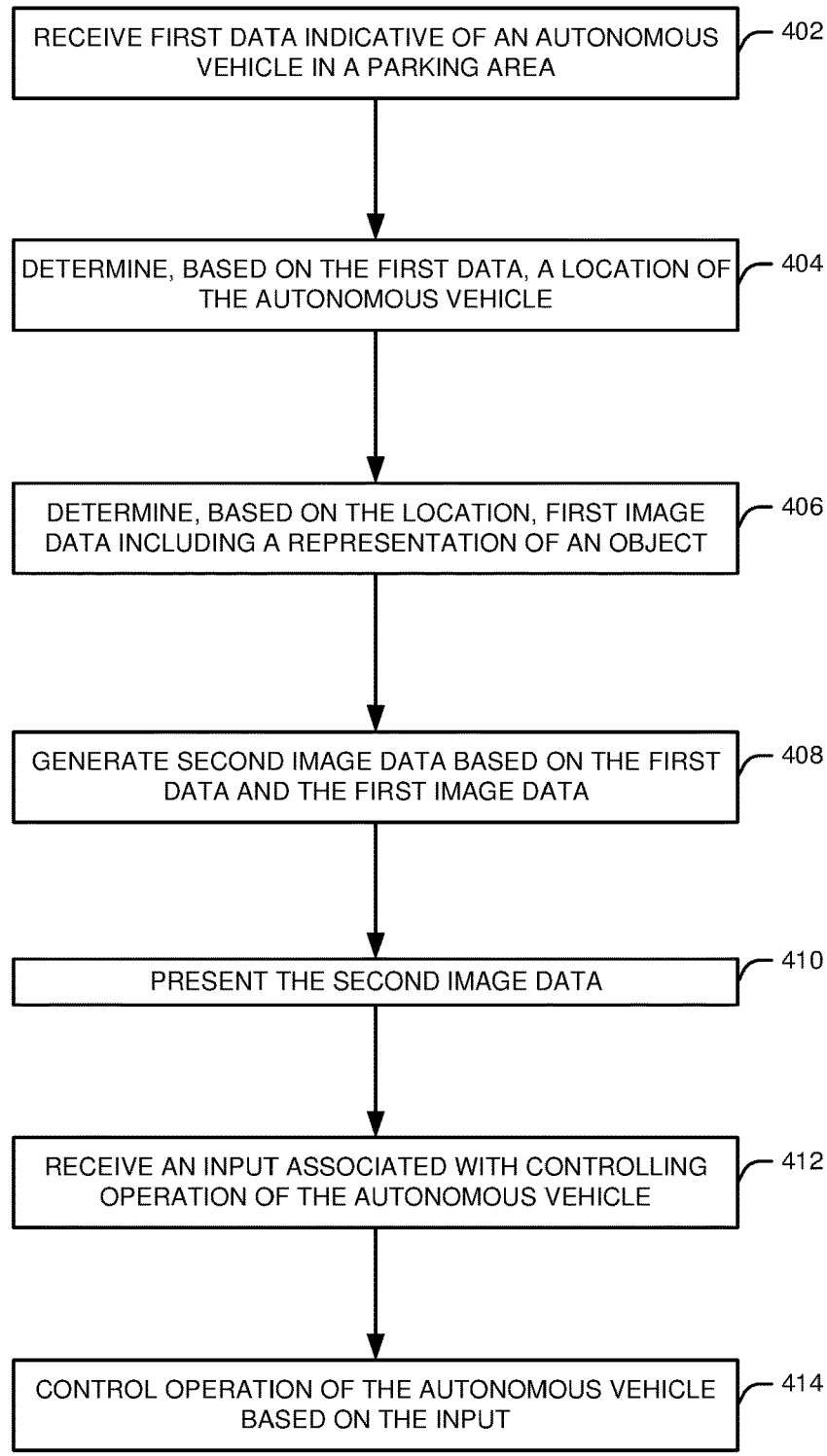
FIG. 4 is a flowchart of an example method for remote parking of autonomous vehicles.

FIG. 4 is a flowchart of an example method 400 for remote parking of autonomous vehicles.

At block 402, a device (or system, e.g., the parking system 100 of FIG. 1, the one or more other devices 152 of FIG. 1, the device 172 of FIG. 1) may receive first data indicative of an autonomous vehicle in a parking area (e.g., the parking area 102 of FIG. 1). The first data may include image data (e.g., the image 160 of FIG. 1) and/or location data (e.g., a location of a camera that captured one or more images showing the autonomous vehicle, global positioning data provided by the autonomous vehicle, or the like). The first data may indicate that the autonomous vehicle is at a location in the parking area, and that other objects may be near the vehicle (e.g., based on known locations of objects at or near the autonomous vehicle's location and/or based on object detection using image analysis). When the first data include image data, the image data may be captured by cameras in the parking area, including vehicle cameras (e.g., the cameras 103 and 132 of FIG. 1).

At block 404, the device may determine, based on the first data, a location of the autonomous vehicle. The first data may include one or more images, or may include location data for the one or more images (e.g., the location of the camera(s) that captured the one or more images). Based on the image data, the camera location, and/or vehicle location data (e.g., global positioning data), the device may determine the location of the vehicle within or near the parking area.

At block 406, the device may determine, based on the location of the autonomous vehicle, first image data including a representation of an object. For example, given the location of the one or more images and the autonomous vehicle, the device may identify known objects at the location (e.g., based on a map or other location information). When the location data identifies that an object is detected (e.g., the vehicle 108 of FIG. 1), the device may use a pre-generated first image data of an object (e.g., the representation of the vehicle 176 of FIG. 1) when generating second image data.

At block 408, the device may generate second image data based on the first data and the first image data. For example, using the first image data, the device may generate a representation (e.g., second image data for respective frames of video) from the perspective of the driver's seat of the autonomous vehicle to present to a human operator (e.g., the human operator 109 of FIG. 1). For example, the exact representation of the object may not be necessary for the human operator to see in order to operate the autonomous vehicle. Instead, the presence of an object near the autonomous vehicle may suffice, so a pre-generated image of an object may be used to generate the real time representation (e.g., the second image data). In addition, because the locations of the image and the location of one or more objects are known, the one or more objects may be shown as a pre-generated representation. In this manner, the first image data may not be present in the first data, but rather may represent pre-generated image assets that may be used to generate second image data that may not be exactly what is captured by any camera images of the parking area.

At block 410, the device may present the second image data as a real time presentation of video (e.g., frames of video) such as is shown in FIG. 1. The second image data may include a combination of image data captured by cameras of the parking area and the first image data, representing image data of generic or known objects near the autonomous vehicle and which a driver of the autonomous vehicle may see if sitting in the driver's seat of the autonomous vehicle. The scale of objects in any frame, or across multiple frames, may depend on the round trip time of data sent from the human operator to the autonomous vehicle, and/or based on the speed of the autonomous vehicle (e.g., to represent the rate at which the autonomous vehicle may approach another object). When multiple autonomous vehicles are in the parking area, the worst (e.g., longest) round trip time from among the autonomous vehicles may be used to generate the second image data (e.g., impacting the scale with which nearby objects are presented).

At block 412, the device may receive an input associated with controlling operation of the autonomous vehicle. For example, the input may include a command to adjust speed, change direction, shift the vehicle into park, or the like. Because the input may be received from a remote operator, the second image data may allow the remote operator to control the autonomous vehicle as if driving the vehicle from the driver's seat. At block 414, the device may control operation of the autonomous vehicle by sending the input to the autonomous vehicle. Accordingly, the second image data may be updated to show a real time representation of what a driver of the autonomous vehicle would see if sitting in the autonomous vehicle. For example, when the autonomous vehicle turns, the second image data may include representations of different objects in front of the autonomous vehicle during the turn, after the turn, etc.

The examples above are not meant to be limiting.

Figure 5:
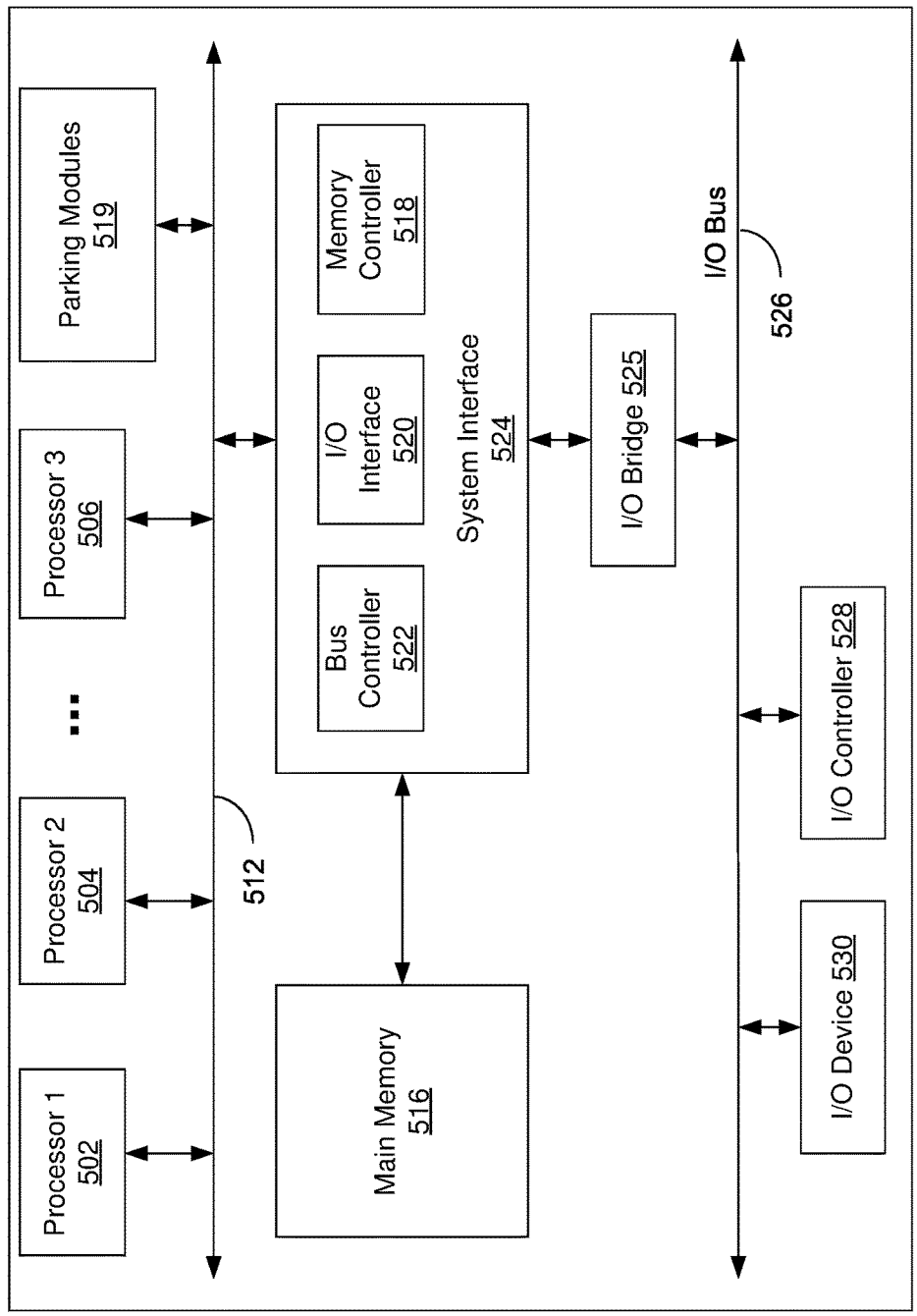
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system upon which any of one or more techniques (e.g., methods) may be performed, in accordance with one or more example embodiments of the present disclosure.

For example, the computing system 500 of FIG. 5 may include or represent the parking system 100 of FIG. 1, the one or more other devices 152 of FIG. 1, the device 172 of FIG. 1. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512.

Processor bus 512, also known as the host bus or the front side bus, may be used to couple the processors 502-506 and parking modules 519 (e.g., capable of performing the method 400 of FIG. 4) with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506, and/or the parking modules 519. Another type of user input device includes cursor control, such as a mouse, a trackball, or cursor direction keys for communicating direction information and command selections to the processors 502-506, and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the parking modules 519. Main memory 516 also may be used for storing temporary variables or other intermediate information during execution of instructions by the processors 502-506 and/or the parking modules 519. System 500 may include read-only memory (ROM) and/or other static storage device coupled to the processor bus 512 for storing static information and instructions for the processors 502-506 and/or the parking modules 519. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the parking modules 519 to perform the process steps described herein. In alternative embodiments, circuitry may be used in place of or in combination with the software instructions. Thus, embodiments of the present disclosure may include both hardware and software components.

According to one embodiment, the processors 502-506 may represent machine learning models. For example, the processors 502-506 may allow for neural networking and/or other machine learning techniques used to operate the vehicle 104 of FIG. 1. For example, the processors 502-506 may include tensor processing units (TPUs) having artificial intelligence application-specific integrated circuits (ASICs), and may facilitate computer vision and other machine learning techniques for image analysis and generation.

In one or more embodiments, the computer system 500 may perform any of the steps of the processes described with respect to FIG. 4.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    receiving, by at least one processor of a device, first data indicative of an autonomous vehicle in a parking area;
    determining, by the at least one processor, based on the first data, a location of the autonomous vehicle;
    determining, by the at least one processor, based on the location, first image data comprising a representation of an object, wherein the first image data is absent from the first data;
    generating, by the at least one processor, second image data based on the first data and the first image data;
    presenting, by the at least one processor, the second image data;
    receiving, by the at least one processor, an input associated with controlling operation of the autonomous vehicle;
    controlling, by the at least one processor, based on the input, the operation of the autonomous vehicle;
    determining a time between receiving the input and controlling the operation of the autonomous vehicle;
    generating third image data based on the time, the first data, and the second image data; and
    presenting the third image data.

2. The method of claim 1, further comprising:
    identifying, based on the first data, a second object associated with the location,
    wherein generating the second image data comprises replacing the second object with the first image data.

3. The method of claim 1, wherein the first data is associated with an image representing a first point of view, and wherein the second image data represents a second point of view different than the first point of view.

4. The method of claim 3, wherein third image data of the image is absent from the first data.

5. The method of claim 1, wherein determining the location is based on a second location of a camera, and wherein the first data is associated with the camera.

6. The method of claim 1, wherein the first image data is generated at a first time, wherein the first data is associated with a second time, and wherein the first time precedes the second time.

7. The method of claim 1, further comprising:
    receiving second data indicative of the autonomous vehicle in the parking area;
    determining, based on the second data, a second location of the autonomous vehicle, the second location different than the location;
    generating third image data based on the second data and the first image data, the second image data comprising a first representation of the object having a first size, and the third image data comprising a second representation of the object having a second size different than the first size; and
    presenting the third image data.

8. The method of claim 1, further comprising:
    receiving second data indicative of a second autonomous vehicle in the parking area;
    determining a first round trip time between the device and the autonomous vehicle;
    determining a second round trip time between the device and the second autonomous vehicle;
    determining that the first round trip time is greater than the second round trip time;
    generating third image data based on the first round trip time, the first data, and the second image data; and
    presenting the third image data.

9. The method of claim 1, further comprising:
    identifying an unoccupied parking space in the parking area;
    generating directions from the location to the unoccupied parking space;
    presenting the directions.

10. A device comprising memory coupled to at least one processor, the at least one processor configured to:
    receive first data indicative of an autonomous vehicle in a parking area;
    determine, based on the first data, a location of the autonomous vehicle;
    determine, based on the location, first image data comprising a representation of an object, wherein the first image data is absent from the first data;
    generate second image data based on the first data and the first image data;
    present the second image data;
    receive an input associated with controlling operation of the autonomous vehicle;
    control, based on the input, the operation of the autonomous vehicle;
    determine a time between receiving the input and controlling the operation of the autonomous vehicle;
    generate third image data based on the time, the first data, and the second image data; and
    present the third image data.

11. The device of claim 10, wherein the at least one processor is further configured to:
    identify, based on the first data, a second object associated with the location,
    wherein to generate the second image data comprises to replace the second object with the first image data.

12. The device of claim 10, wherein the first data is associated with an image representing a first point of view, and wherein the second image data represents a second point of view different than the first point of view.

13. The device of claim 12, wherein third image data of the image is absent from the first data.

14. The device of claim 10, wherein to determine the location is based on a second location of a camera, and wherein the first data is associated with the camera.

15. A system comprising:
    a camera; and
    memory coupled to at least one processor, the at least one processor configured to:
        receive first data indicative of an autonomous vehicle in a parking area, the first data associated with the camera;
        determine, based on the first data, a location of the autonomous vehicle;
        determine, based on the location, first image data comprising a representation of an object, wherein the first image data is absent from the first data;

generate second image data based on the first data and the first image data;

present the second image data;

receive an input associated with controlling operation of the autonomous vehicle;

control, based on the input, the operation of the autonomous vehicle;

determine a time between receiving the input and controlling the operation of the autonomous vehicle;

generate third image data based on the time, the first data, and the second image data; and present the third image data.

16. The system of claim 15, wherein the at least one processor is further configured to:

identify, based on the first data, a second object associated with the location, wherein to generate the second image data comprises to replace the second object with the first image data.

17. A method, comprising:

receiving, by at least one processor of a device, first data indicative of an autonomous vehicle in a parking area;

determining, by the at least one processor, based on the first data, a location of the autonomous vehicle;

determining, by the at least one processor, based on a the location, first image data comprising a representation of an object, wherein the first image data is absent from the first data;

generating, by the at least one processor, second image data based on the first data and the first image data;

presenting, by the at least one processor, the second image data;

receiving, by the at least one processor, an input associated with controlling operation of the autonomous vehicle;

controlling, by the at least one processor, based on the input, the operation of the autonomous vehicle;

receiving second data indicative of a second autonomous vehicle in the parking area;

determining a first round trip time between the device and the autonomous vehicle;

determining a second round trip time between the device and the second autonomous vehicle;

determining that the first round trip time is greater than the second round trip time;

generating third image data based on the first round trip time, the first data, and the second image data; and presenting the third image data.

* * * * *